(12) United States Patent
Tanno

(10) Patent No.: US 7,874,329 B2
(45) Date of Patent: *Jan. 25, 2011

(54) LOW NOISE PNEUMATIC TIRE

(75) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 680 days.

This patent is subject to a terminal disclaimer.

(21) Appl. No.: 11/795,350

(22) PCT Filed: Feb. 14, 2006

(86) PCT No.: PCT/JP2006/302488

§ 371 (c)(1),
(2), (4) Date: Jul. 13, 2007

(87) PCT Pub. No.: WO2006/088000

PCT Pub. Date: Aug. 24, 2006

(65) Prior Publication Data

US 2008/0099117 A1    May 1, 2008

(30) Foreign Application Priority Data

Feb. 16, 2005    (JP) .............................. 2005-039415

(51) Int. Cl.
*B60C 5/00* (2006.01)
*B60C 19/00* (2006.01)

(52) U.S. Cl. .................... 152/155; 152/154.1; 152/157; 152/158; 152/450

(58) Field of Classification Search ............. 152/154.1, 152/155, 157, 450
See application file for complete search history.

(56) References Cited

U.S. PATENT DOCUMENTS 7,581,577 B2 * 9/2009 Tanno ......................... 152/450
2005/0155686 A1 7/2005 Yukawa et al.

FOREIGN PATENT DOCUMENTS

| EP | 1072447 | * | 1/2001 |
| JP | 2003-226104 | | 8/2003 |
| JP | 2004-291855 | | 10/2004 |
| WO | WO 03/103989 | | 12/2003 |
| WO | WO 2005/012006 | | 2/2005 |
| WO | WO 2005/012007 | * | 2/2005 |
| WO | WO 2006/013874 | | 2/2006 |

* cited by examiner

*Primary Examiner*—Justin Fischer
(74) *Attorney, Agent, or Firm*—Greer, Burns & Crain, Ltd.

(57) ABSTRACT

Disclosed is a low noise pneumatic tire in which a plurality of noise absorbing members of a porous material are attached to the tire inner peripheral surface with intervals in the tire circumferential direction. The number of the noise absorbing members is from 5 to 50. The total length obtained by integrating the lengths of the noise absorbing members in the tire circumferential direction is not less than 75% of the tire maximum inner peripheral length. The distance between each adjacent two of the noise absorbing members is equal to or more than the maximum thickness of the noise absorbing members at the end portions thereof in the tire circumferential direction, while being not more than 15% of the tire maximum inner peripheral length.

7 Claims, 4 Drawing Sheets (a)

(b)

(c)

(b)

LOW NOISE PNEUMATIC TIRE

TECHNICAL FIELD

The present invention relates to a low noise pneumatic tire. Specifically, the present invention relates to a low noise pneumatic tire with an excellent noise reduction performance by noise absorbing members attached to the tire inner peripheral surface, in which the durability of the noise absorbing members is improved while the tire vibration is suppressed.

BACKGROUND ART

As one of noises generated in a pneumatic tire, there is cavity resonance sound which is generated due to the vibration of the air filled in the tire. When the tire is running on a road surface, the tread portion is vibrated due to the roughness of the road surface. The vibration of the tread portion causes the air in the tire to vibrate, so that the cavity resonance sound is generated. It is known that the frequency of the cavity resonance sound of a pneumatic tire is approximately 250 Hz.

Conventionally, as a method of reducing the cavity resonance sound in a pneumatic tire, the following ones as shown respectively in FIGS. 7(a) and 7(b) have been proposed. In these methods, one or more noise absorbing members 5 formed of a porous material are attached continuously or with intervals to the tire inner peripheral surface of a tread portion 1 in a pneumatic tire T so that cavity resonance sound is absorbed by the noise absorbing members 5 (for example, see patent Documents 1 and 2). In order to improve the effect of reducing cavity resonance sound with such noise absorbing members, it is necessary that the noise absorbing members be attached to the tire inner peripheral surface as widely as possible.

However, there is a disadvantage in the case of continuously disposing the noise absorbing member 5 along the whole of the tire inner peripheral surface as shown in FIG. 7(a). Every one rotation of the pneumatic tire T causes the connecting portion of the two ends of the noise absorbing member 5 in the tire circumferential direction to be alternately and repeatedly compressed and expanded. Accordingly, the connecting portion is likely to be damaged due to the stress concentration thereon. Moreover, suppose a case where the noise absorbing members 5 are disposed with intervals as shown in FIG. 7(b) for the purpose of preventing the noise absorbing members from being damaged. In a state where each adjacent two of the noise absorbing members 5 and 5 in the tire circumferential direction are widely spaced apart from each other, the rotational balance of the tire is disrupted. As a result, vibration is generated when the tire is rotated.

Patent Document 1: Japanese Patent application Kokai publication No. Sho62-216803
Patent Document 2: Japanese patent application Kokai publication No. 2003-252003

DISCLOSURE OF THE INVENTION

An object of the present invention is to provide a low noise pneumatic tire with an excellent noise reduction performance by noise absorbing members attached to the tire inner peripheral surface, in which the durability of the noise absorbing members is improved while the tire vibration is suppressed.

For the purpose of solving the above-described problems, the low noise pneumatic tire according to the present invention comprises the following characteristics. The low noise pneumatic tire includes a plurality of noise absorbing members of a porous material, which are disposed with intervals in the tire circumferential direction on the inner peripheral surface of the tire. The number of the noise absorbing members is from 5 to 50, the total length obtained by integrating the lengths of the noise absorbing members in the tire circumferential direction is not less than 75% of the tire maximum inner peripheral length, and the distance between each adjacent two of the noise absorbing members is not less than the maximum thickness of the noise absorbing members at the end portions thereof in the tire circumferential direction, while being not more than 15% of the tire maximum inner peripheral length.

Since the pneumatic tire according to the present invention disposes a plurality of noise absorbing members with intervals on the tire inner peripheral surface as described above, it is possible to ease the flexural deformation of the noise absorbing members due to the deformation of the portion of the tire contacting the ground. As a result, the durability of the noise absorbing members is improved as compared with the case of continuously disposing the noise absorbing member. In addition, the number of noise absorbing members is from 5 to 50, while the distance between each adjacent two of the noise absorbing members is not less than the maximum thickness of the end portions of the noise absorbing members. Accordingly, it is possible to prevent each adjacent two noise absorbing members from interfering with each other when the tire is rotated, so as to suppress damage to the noise absorbing members. Furthermore, the total length obtained by integrating the lengths of the noise absorbing members in the tire circumferential direction is not less than 75% of the tire maximum inner peripheral length. Accordingly, it is possible to sufficiently secure the amount of absorption of cavity resonance noise in the tire by the noise absorbing members, so as to achieve an excellent low-noise performance. Still furthermore, the distance between each adjacent two of the noise absorbing members is not more than 15% of the tire maximum inner peripheral length while the number of the noise absorbing members is from 5 to 50. Accordingly, it is possible to balance the weight in the tire circumferential direction, suppressing the tire vibration at the time of high-speed running.

BEST MODES FOR CARRYING OUT THE INVENTION

Figure 1:
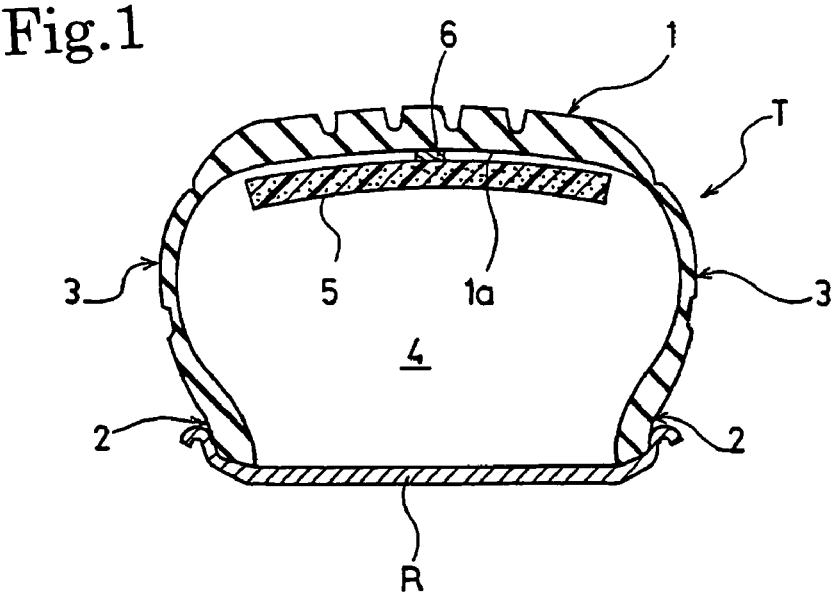
FIG. 1 is a cross-sectional view taken along the meridional direction, and showing a state where a pneumatic tire according to an embodiment of the present invention is mounted on a rim.
Figure 2:
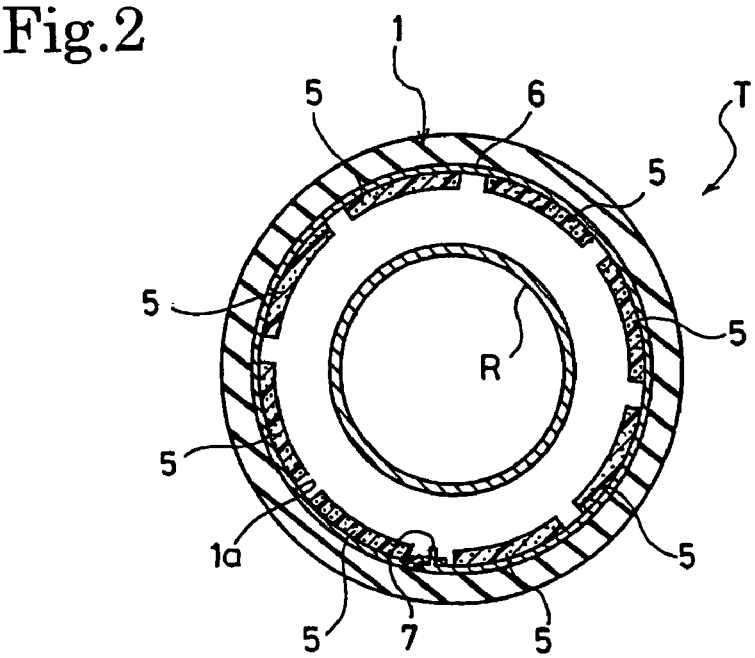
FIG. 2 is a cross-sectional view taken along the equatorial direction, and showing the tire of FIG. 1.

As shown in FIGS. 1 and 2, a pneumatic tire T comprises a tread portion 1, a pair of right and left side wall portions 3, 3 and a pair of right and left bead portions 2, 2. The side wall portions 3, 3 as well as the bead portions 2, 2 are connected with the right and left sides of the tread portion 1, respectively. The pneumatic tire T is mounted on a rim R to form a cavity portion 4 inside the tire T, in which air is filled so that the tire T is inflated to a pressure defined by the standard.

Figure 3:
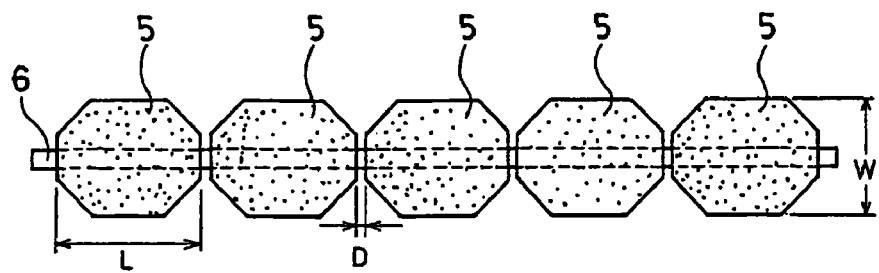
FIG. 3 is a plan view showing an example of noise absorbing members to be used in the present invention.

An elastic band 6 is annularly pressed against to be supported on the tire inner peripheral surface 1a of the tread portion 1, and a plurality of noise absorbing members 5 constituted of independent pieces are fixed with intervals to the elastic band 6 along the longitudinal direction. These noise absorbing members 5 are formed of a porous material having open cells. As shown in FIG. 3, the plurality of noise absorbing member 5 are first fixed to one side of the linear elastic band 6 with intervals of certain distance D. Thereafter, the elastic band 6 is inserted into the tire T while being annularly curved along the tire inner peripheral surface 1a. Then, the two ends of the elastic band 6 are joined to each other with a hook 7 or the like.

Figure 4:
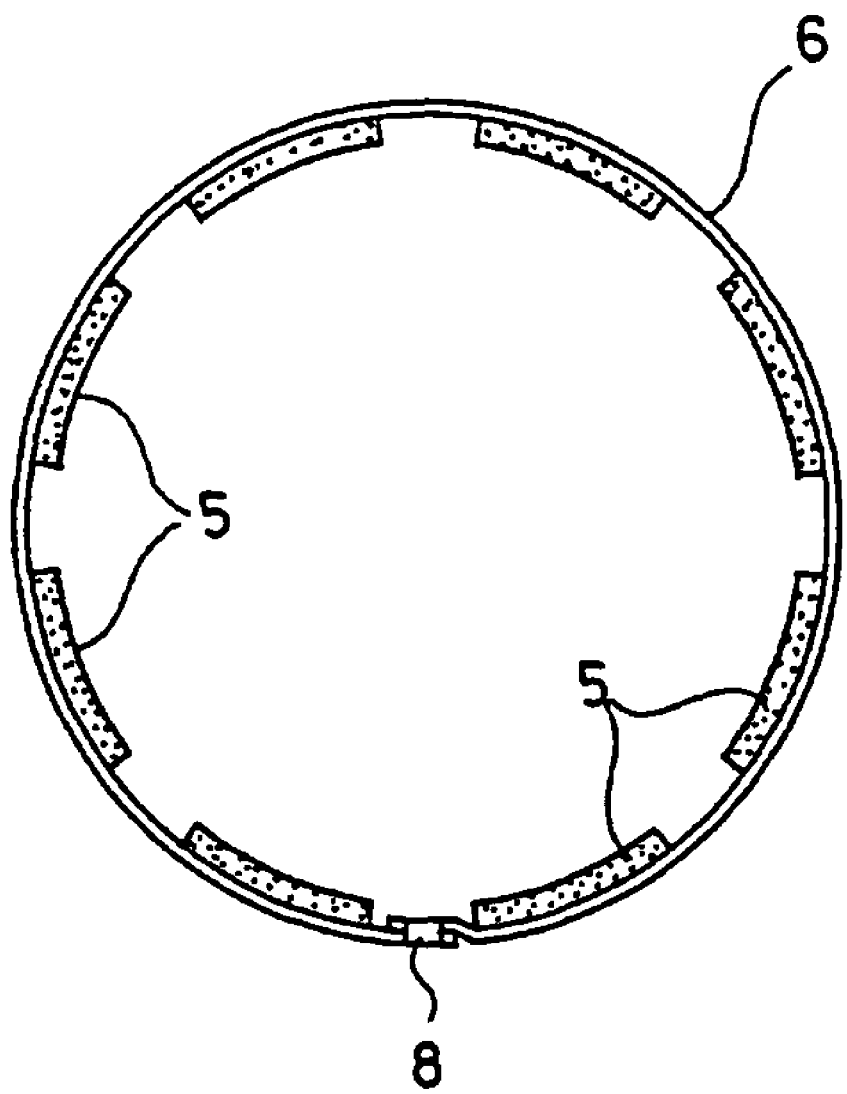
FIG. 4 is a side view showing an example of a state where the noise absorbing members to be used in the present invention and an elastic band have not been inserted into a pneumatic tire yet.

The noise absorbing members 5 may be welded by an ultrasonic treatment or the like to the elastic band 6, or may be bonded to the elastic band 6 with an adhesive agent, so as to be fixed thereto. The two ends of the elastic band 6 may be joined to each other with a clamp 8 as shown in FIG. 4. Alternatively, the two ends of the elastic band 6 may be joined by bonding with an adhesive or by melt-welding.

The indirect attachment of the noise absorbing members 5 to the tire inner peripheral surface 1a of the pneumatic tire T with the elastic band 6 facilitates the attachment and detachment of the noise absorbing members 5 between different tires. For this reason, when a tire in use becomes unusable due to wear or a puncture, the noise absorbing members used in the tire having been unusable can be reused for another new tire together with the elastic band.

As a method of attaching the noise-absorbing members 5 to the tire inner peripheral surface 1a with the elastic band 6, it is preferable, as shown in the figures, that the noise absorbing members 5 are first disposed on the inner peripheral surface of the elastic band 6, and then the elastic band 6 is directly pressed against to be fixed to the tire inner peripheral surface 1a. Of course, on the contrary, it is possible that the noise absorbing members 5 are first disposed on the outer peripheral surface of the elastic band 6, and then the noise absorbing members 5 are pressed to the tire inner peripheral surface 1a with the elastic band 6. In the latter case, a part of the surface of each noise absorbing member 5 is blocked by the elastic band 6. Accordingly, the noise absorbing effect of the noise absorbing members 5 is reduced by the amount of blocking. In the former case, however, the surface of each noise absorbing member 5 is not blocked by the elastic band 6. Accordingly, it is possible to obtain much higher noise absorbing effect. Moreover, the entirety of the elastic band 6 in the circumferential direction thereof is closely attached to the tire inner peripheral surface 1a, so that a high friction is obtained. As a result, the noise absorbing members 5 are further stably retained.

Alternatively, as another method of attaching the noise absorbing members 5 to the tire inner peripheral surface 1a, it is also conceivable that the elastic band 6 be caused to penetrate into the middle portion of the noise absorbing members 5 in the thickness direction thereof, thus holding the noise absorbing members 5. However, this attaching method is likely to cause more stress concentration at the penetrated portions of the noise absorbing members 5 due to the pressure of the elastic band 6. Accordingly, the noise absorbing members 5 are likely to be damaged at an early stage.

The noise absorbing members 5 are formed of a porous material. As the porous material, a foamed resin having open cells is preferable. More preferably, a foamed urethane resin may be used. Among foamed urethane resins, a polyether urethane foam with a low density is preferable since the polyether urethane foam has an excellent pressure resistance, and accordingly is unlikely to be compressed and deformed by the tire internal pressure. As a material for the elastic band 6, any of metal or resin may be used, however, a resin is preferable. As the resin for the elastic band 6, polypropylene and polyethylene are preferable since they have a high tensile modulus of elasticity.

In the pneumatic tire according to the present invention, in the above-described constitution, the number of the noise absorbing members 5 disposed as a plurality of independent pieces in the tire circumferential direction is 5 to 50. At the same time, the total length obtained by integrating the lengths of all the noise absorbing members 5 in the tire circumferential direction is not less than 75%, preferably not less than 85%, of the tire maximum inner peripheral length. In addition, the distance D between each adjacent two of the plurality of noise absorbing members 5 in the tire circumferential direction is not less than one times of, preferably not less than 1.2 times of the maximum thickness of the noise absorbing members 5 at the end portions thereof in the tire circumferential direction, while being not more than 15%, preferably not more than 10%, of the tire maximum inner peripheral length.

Since the number of the noise absorbing members 5 disposed in the tire circumferential direction is 5 to 50 while the total length obtained by integrating the lengths of all the noise absorbing members 5 in the tire circumferential direction is not less than 75% of the tire maximum inner peripheral length, it is possible to sufficiently secure the amount of absorption of cavity resonance noise. Accordingly, it is possible to obtain an excellent noise reduction performance while suppressing the tire vibration at the time of high-speed rotation. When the number of the noise absorbing materials 5 is 4 or less, the weight balance in the tire circumferential direction is disrupted, so that the tire vibration at the time of high-speed rotation is increased. When the number of the noise absorbing members 5 is more than 50, the length L of each noise absorbing member 5 becomes so small that the noise absorbing members 5 become likely to be easily damaged. When the total length obtained by integrating the lengths of all the noise absorbing members 5 in the tire circumferential direction is less than 75% of the tire maximum inner peripheral length, the noise reduction effect is unlikely to be obtained. At the same time, the weight balance is also disrupted, so that the tire vibration is likely to occur.

Moreover, in the pneumatic tire according to the present invention, the distance D between each adjacent two of the plurality of noise absorbing members 5 in the tire circumferential direction is not less than the maximum thickness of the noise absorbing members 5 at the end portions thereof in the tire circumferential direction. Accordingly, it is possible to prevent the interference between the noise absorbing members 5 rubbing against one another at the time when the tire rotates. As a result, the noise absorbing members 5 are prevented from being damaged. Moreover, since the distance D between each adjacent two of the noise absorbing members 5 and 5 is not more than 15% of the tire maximum inner peripheral length, it is possible to make uniform the weight balance of the noise absorbing members 5, thus suppressing the tire vibration.

When the distance D between each adjacent two of the noise absorbing members 5 and 5 is less than the maximum thickness of the noise absorbing member 5 at the end portion thereof in the tire circumferential direction, the end portions of each adjacent two of the noise absorbing members 5 interfere with each other, so that the noise absorbing members 5 are likely to be damaged. When the distance D is more than 15% of the tire maximum inner peripheral length, the weight balance of the noise absorbing members 5 is disrupted, thus leading to the occurrence of the tire vibration at the time of high-speed rotation.

It is preferable that the length L of each noise absorbing member 5 in the tire circumferential direction be 2% to 15% of the tire maximum inner peripheral length. When the length L of each noise absorbing member 5 is less than 2% of the tire maximum inner peripheral length, the bending rigidity of the noise absorbing member 5 in the tire width direction is excessively reduced. Accordingly, the noise absorbing member 5 is likely to be damaged. When the length L of each noise absorbing member 5 is more than 15% of the tire maximum inner peripheral length, the deformation of the noise absorbing member 5 in the tire radial direction is increased when the tire rotates, so that the noise absorbing members 5 are likely to be damaged. It is preferable that the plurality of noise absorbing members 5 have the same length L for the purpose of suppressing the tire vibration. However, the noise absorbing members 5 have lengths different from one another as long as the tire vibration is suppressed to within the allowable range.

It is preferable that the maximum width W of each noise absorbing member 5 be 50% to 90%, more preferably 55% to 80%, of the tire maximum width. When the maximum width W of the noise absorbing member 5 is less than 50% of the tire maximum width, the effect of reducing the cavity resonance noise is not sufficiently obtained. When the maximum width W of the noise absorbing member 5 is more than 90% of the tire maximum width, the noise absorbing member 5 extends to the side wall portions 3. As a result, the durability of each noise absorbing member 5 is reduced.

It is preferable that the thickness of each noise absorbing member 5 be 5 mm to 50 mm, more preferably 10 mm to 40 mm. In addition, it is preferable that all the plurality of noise absorbing members 5 disposed in the tire circumferential direction have the same thickness for the purpose of suppressing the tire vibration. However, the noise absorbing members 5 may have thicknesses different from one another as long as the tire vibration is suppressed to within the allowable range. Moreover, the thickness of each single noise absorbing member 5 may be uniform in every portion, or may be changed in the longitudinal direction and/or in the width direction.

Figure 5:
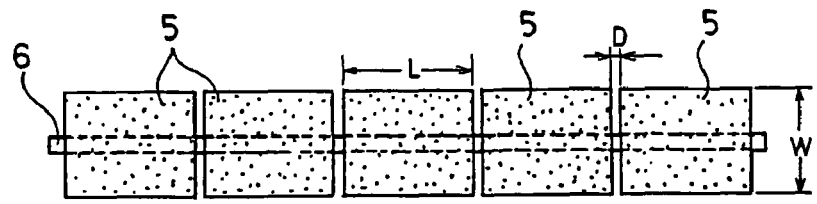
FIGS. 5(a) to 5(c) are plan views respectively showing other examples of noise absorbing members to be used in the present invention.
Figure 5:
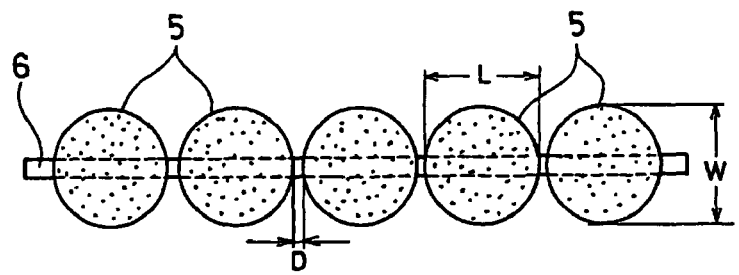
Figure 5:
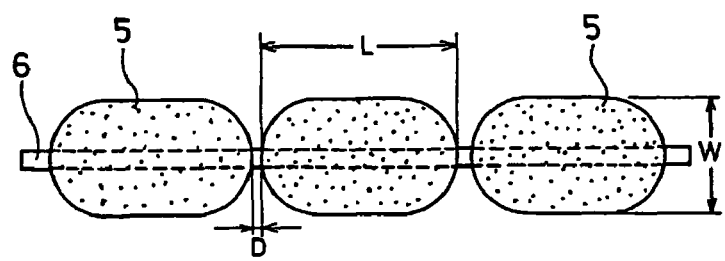

The shape of each noise absorbing member 5 in the plan view is not particularly limited, but preferably is a polygonal shape having five or more sides in which inner angles are obtuse angles, such as an octagon shown as an example in FIG. 3. Employing such a polygon having five or more sides suppresses the damage of the noise absorbing member 5 in a vicinity of the end portions thereof. As an example of the shape of each noise absorbing member 5 in the plan view, a quadrangle having inner angles of right angles as shown in FIG. 5(a), a circle as shown in FIG. 5(b), and an ellipse as shown in FIG. 5(c).

Figure 6:
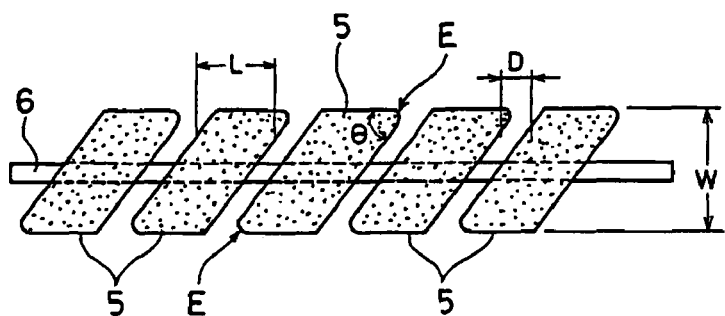
FIG. 6 is a plan view showing still another embodiment of noise absorbing members to be used in the present invention.

Alternatively, it is possible to employ a parallelogram having edges E with acute angles θ as shown in FIG. 6 for the shape of each noise absorbing member 5 in the plan view. However, in the case of employing a shape having edges E with acute angles θ, it is preferable that each edge E be chamfered into an arc shape. The chamfering makes it possible to reduce the damage of the edges E of the noise absorbing members.

It should be noted that the "tire maximum inner peripheral length" in the present specification represents the inner peripheral length on the equatorial line in the inner peripheral surface of the pneumatic tire in a state where the pneumatic tire is mounted on a rim specified by JATMA, and is then inflated to the standard internal pressure. Similarly, the "tire maximum width" in the present specification represents the tire maximum width of the pneumatic tire in a state where the pneumatic tire is mounted on a rim specified by JATMA, and is then inflated to the standard internal pressure.

EXAMPLES

Three pneumatic tires having the same tire size of 215/60R16 were prepared. Then, noise absorbing members obtained by forming a foamed polyurethane resin having open cells were attached respectively to the tire inner peripheral surfaces of the prepared pneumatic tires, so that the following attachment structures were obtained.

(a) Example 1

Attachment Structure: FIG. 2
Shape of Noise Absorbing Member: an octagon having a width W of 150 mm, a thickness of 20 mm and a length L of 180 mm, and having each edge chamfered by 60 mm×60 mm.
Number of Noise Absorbing Members: 9 (disposed at intervals of distance D of approximately 30 mm each)

(b) Comparative Example 1

Figure 7:
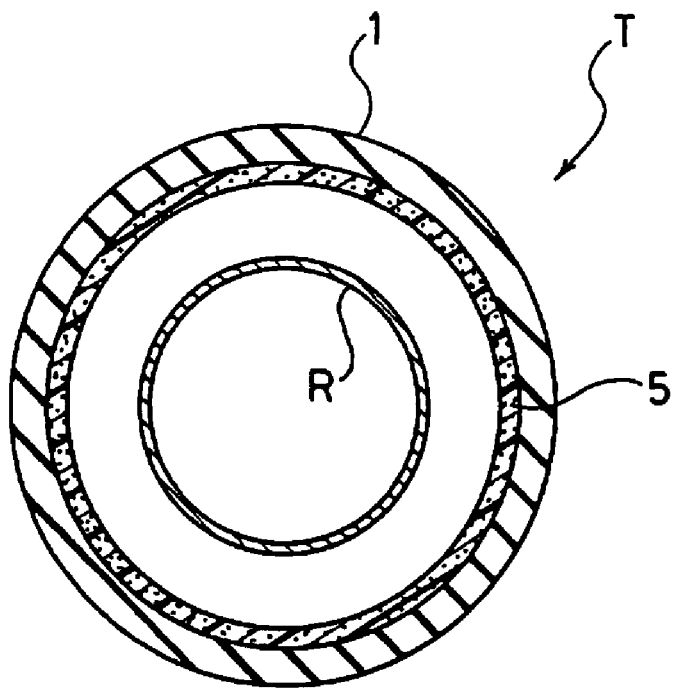
FIGS. 7(a) and 7(b) are cross-sectional views taken along the equatorial direction, and showing conventional tires, respectively.
Figure 7:
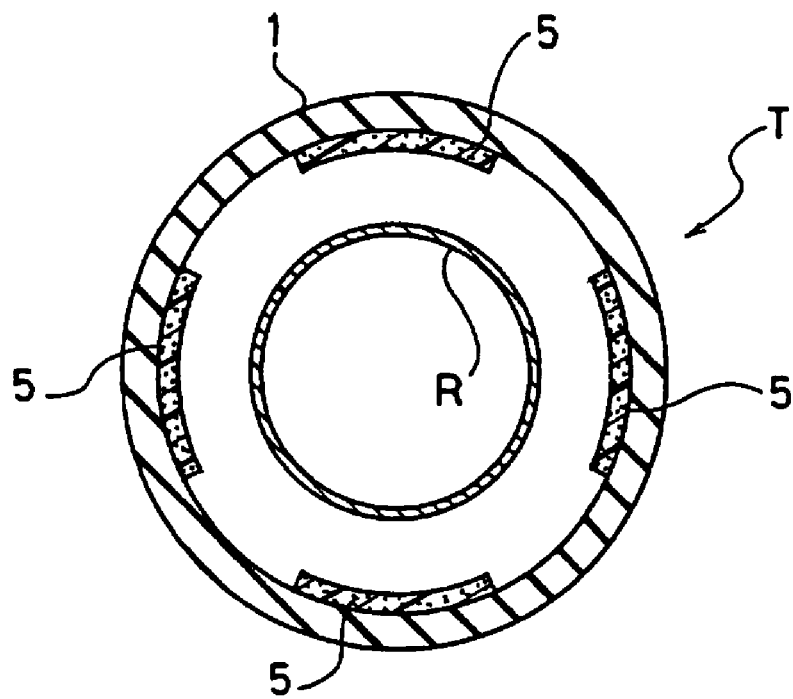

Attachment Structure: FIG. 7(b)
Shape of Noise Absorbing Member: an octagon having a width W of 150 mm, a thickness of 20 mm and a length L of 200 mm, and having each edge chamfered by 60 mm×60 mm.
Number of Noise Absorbing Members: 4 (uniformly disposed at an angle of 90° between each two noise absorbing members with respect to the tire axis)

(c) Conventional Example 1

Each of these three kinds of pneumatic tires was mounted on a rim of a wheel, and was then inflated to an air pressure of 150 kPa. Then, the durability and the vibration characteristics of the noise absorbing members of each tire were measured by the following testing method. The results of the measurements are shown in Table 1.

[Durability of Noise Absorbing Members]

Each test tire was attached to a rotating drum of a drum testing machine with a load of 7.8 kN, was then rotated at a speed of 80 km/h. Then, the distance for which the tire ran until damage occurred in the noise absorbing members was measured. The measurement results are indicated by indices where the measurement result of Comparative Example 1 is taken as 100. The larger the index is, the more excellent the test tire is in the durability of the noise absorbing members.

[Vibration Characteristics]

By using a uniformity machine, the secondary component of the radial force variation (RFV) of each test tire running at a speed of 100 km/h was measured. The measurement results are indicated by indices where the measurement result of Conventional Example 1 is taken as 100. The smaller the index is, the more excellent the test tire is in the vibration characteristics.

TABLE 1

|  | Example 1 | Comparative Example 1 | Conventional Example 1 |
|---|---|---|---|
| Shape of Noise Absorbing Member in Plan View | Octagon | Octagon | Continuous Band |
| Attachment Structure of Noise Absorbing Members | FIG. 2 | FIG. 7(b) | FIG. 7(a) |
| Durability of Noise Absorbing Member (Index) | 108 | 100 | 86 |
| Vibration Characteristics (Index) | 100 | 145 | 100 |

As is clear from the results shown in Table 1, the pneumatic tire of Example 1 is improved, having a good balance between the durability of noise absorbing members, and the vibration characteristics, in comparison with the pneumatic tires of Comparative Example 1 and Conventional Example 2.

What is claimed is:

1. A low noise pneumatic tire comprising a plurality of noise absorbing members of a porous material, which are attached on the inner peripheral surface of the tire to be disposed with intervals in the tire circumferential direction, wherein the number of the noise absorbing members is from 5 to 50, the total length obtained by integrating the lengths of the noise absorbing members in the tire circumferential direction is not less than 75% of the tire maximum inner peripheral length, and the distance between each adjacent two of the noise absorbing members is not less than the maximum thickness of the end portions of the noise absorbing members in the tire circumferential direction, while being not more than 15% of the tire maximum inner peripheral length, wherein the shape of each noise absorbing member in a plan view is a polygon in which all the inner angles are obtuse angles.

2. The low noise pneumatic tire according to claim 1, wherein an elastic band is disposed in the tire circumferential direction, the noise absorbing members being fixed to any of the inner and outer peripheral surfaces of the elastic band.

3. The low noise pneumatic tire according to claim 2, wherein the noise absorbing members are fixed to the inner peripheral surface of the elastic band, and the elastic band is attached to the inner peripheral surface of the tire with a pressure.

4. The low noise pneumatic tire according to claim 1, wherein the maximum width of each noise absorbing member is 50% to 90% of the tire maximum width.

5. The low noise pneumatic tire according to claim 1, wherein the thickness of each noise absorbing member is 5 mm to 50 mm.

6. The low noise pneumatic tire according to claim 1, wherein the noise absorbing members are made of a foamed resin having open cells.

7. The low noise pneumatic tire according to claim 2, wherein the elastic band is a molded resin.

* * * * *